United States Patent [19]

Knothe et al.

[11] Patent Number: 4,656,599

[45] Date of Patent: Apr. 7, 1987

[54] ELECTRIC BALANCE

[75] Inventors: Erich Knothe, Bovenden; Franz-Josef Melcher; Jürgen Ober, both of Hardegsen; Christoph Berg, Adelebsen; Klaus Dardat, Nörten-Hardenberg; Eduard Bierich, Göttingen; Günther Maaz, Uslar-Wiensen, all of Fed. Rep. of Germany

[73] Assignee: Sartorius GmbH, Fed. Rep. of Germany

[21] Appl. No.: 664,966

[22] Filed: Oct. 26, 1984

[30] Foreign Application Priority Data

Nov. 9, 1983 [DE] Fed. Rep. of Germany ....... 3340512

[51] Int. Cl.$^4$ .................... G01G 7/00; G01L 25/00
[52] U.S. Cl. .................... 364/567; 364/571; 177/212
[58] Field of Search .............. 177/212, 226, 185; 364/567, 571

[56] References Cited

U.S. PATENT DOCUMENTS

| 4,396,080 | 8/1983 | Dee | 177/185 |
| 4,457,386 | 7/1984 | Schett et al. | 177/212 |
| 4,464,725 | 8/1984 | Briefer | 364/567 X |
| 4,487,280 | 12/1984 | Knothe et al. | 177/212 |
| 4,490,803 | 12/1984 | Briggs | 364/571 |
| 4,553,618 | 11/1985 | Kusmenskji et al. | 177/185 |

Primary Examiner—George H. Miller, Jr.
Attorney, Agent, or Firm—Eric P. Schellin

[57] ABSTRACT

It is necessary, when high requirements are demanded from balances, that the effect of different disturbance variables such as, e.g., temperature and/or moisture on the measuring system be corrected. To this end, temperature and moisture sensors are used from whose output signal correction values are calculated. The invention suggests that a storage area be provided into which the instantaneous measured results of these sensors are stored in succession, where they remain stored for a set time. This data stemming from different times, evaluated with set weighting factors, could then be used to calculate the corrections. This makes it possible to obtain a good correction of changing disturbances even with a different behavior in time of sensors and measuring system.

17 Claims, 3 Drawing Figures

ELECTRIC BALANCE

BACKGROUND OF THE INVENTION

1. Field of the invention

The invention is related to an electric balance with a measured value receiver for generating a weight-dependent signal, having a digital signal processing unit with means for detecting disturbances which affect the measured value receiver (sensor) and with means for correcting the error of the measured value receiver which result from these interfering disturbances.

2. Description of the Prior Art

Balances of this type are known, for example, from DE-OS No. 32 13 016, which describes in particular the correction of temperature errors. DE-OS No. 31 06 534 teaches the use of moisture and pressure sensors to correct corresponding dependencies on moisture of pressure of the measured value receiver.

A disadvantage of these known balances is the fact that only the instantaneous value of a particular disturbance variable can be detected and calculated. The behavior in time of the particular sensor must therefore be adapted to the behavior in time of the measured valued receiver. In the case of temperature sensor, for example, this must occur by means of a properly selected attachment point, properly selected heat capacity and properly selected heat resistance to the attachment point. However, this adaptation of the behavior in time is bothersome and also possible only to a limited extent. This is especially, the case, since the behavior in the time of the measured value receiver, which is constructed with many different individual parts, can not be represented by a simple mathematical relation. Moreover, this adaptation can be optimally performed for only *one* variable to be corrected, such as, for example, the sensitivity, since in general each variable to be corrected has a different behavior in time. However, when errors are corrected in the unit, all errors, if possible, should be corrected, thus, in addition to sensitivity errors also zero point errors and linearity errors.

SUMMARY

The invention therefore has the task of improving a balance of the type initially mentioned in such a manner that a simpler adaptation of the behavior in time of the sensor or sensors to the behavior in time of the measure of value receiver is possible, and that different errors of the measured value receiver with different bahavior in time can be corrected with *one* sensor.

The invention solves this task as follows: A storage area 20 is present in the digital signal processing unit to which digital data is continuously supplied and stored there for a set time. This data is derived from the particular output signal of the sensor or sensors 24′, 24″, 24‴, 25′, 25″ and, optionally, from the output signal of the measured value receiver (elements 1–17). the digital signal processing unit evaluates the data stemming from different times with set weighing factors and uses it to determine the corrections to be put on the output signal of the measured value receiver.

This makes available both the instantaneous data and the previous data, and the adaptation to the behavior in time of the measured value receiver can be easily simulated by an appropriate selection of the weighting factors.

In the case of a rapid temperature sensor, for example, and a slow-reacting measured value receiver, the older data is taken more heavily into consideration than the most recent data, while in the case of a rapid-reacting measured value receiver the most recent data is given particular consideration and the oldest data receives a weighing factor of zero. Thus, the adaptation is possible by means of simply varying of the weighting factors without, the location or the method of fastening of the temperature sensor having to be changed.

The organization of this storage area can be selected in accordance with the hardware used for the electronic components. It is advantageous, for example, to organize this storage area in the form of a shift register, whereby when a new data record is stored, all previously stored data records shift by one storage place and the last data record is erased.

Another advantageous embodiment results when the digital signal processing unit is a microprocessor. In this instance a part of the (internal or external) RAMs of the microprocessor can be used for the storage area. It is also possible in this instance to leave each data record at a fixed storage location, to erase only the oldest particular data record and replace it by the new data record.

Since the temperature is generally the most significant disturbance variable, it is advantageous if at least one temperature sensor is present as a sensor.

In a measured value receiver in accordance with the principle of the electromagnetic compensation of force a temperature sensor is fastened to the compensating coil in an advantageous construction. This makes it possible for the temperature changes produced under changing loads by the correspondingly changing compensation current to be detected quite rapidly and to be calculated as to their slow effect on thermally inert component parts via the average value formation in time of the values stored in the storage area.

It is advantageous to use an oscillator with temperature-dependent resonance frequency as temperature sensor, since it supplies an output signal which is easy to digitize. For example, an oscillator crystal with an appropriate intersection angle is such an oscillator with temperature-dependent resonance frequency which is also distinguished by a very good long-time stability.

A particularly economical evaluation circuit is obtained if the temperature-dependent output frequency of the oscillator is divided down to the magnitude of 1 Hz by divider stages such as are contained in commercial clock ICs and if the length between two successive impulses is counted out by a constant reference frequency. This numerical result is then a digital measure for the temperature of the oscillator.

In a measured value receiver in accordance with the principle of the electromagnetic compensation of force the power loss in the coil varies as a function of the compensation current and thus as a function of the load. In fact, the power loss rises quadratically with the load. The digital signal processing unit can therewith calculate the instanteneous power loss in the coil from the load value, i.e. the output signal of the measured value receiver. Another advantageous embodiment thus provides that in a measured value receiver in accordance with the principle of the electromagnetic compensation of force the data supplied to the storage area is derived from the output signal of the temperature sensor and the squared output signal of the measured value receiver. The temperature difference from the load-dependent power loss in the coil are then calculated from the output signal of the measured value receiver, while the temperature sensor detects the basic temperature of the measured value receiver only supplementarily. Different weighting factors can be used for both temperature data in accordance with the different chronological and spatial effect of variations in the base temperature and of variations in the power loss.

Another advantageous embodiment provides that at least one moisture sensor is present as a sensor. A moisture correction is necessary, for example, in the case of measured value receivers with adhered-on wire strain gauges, since the adhesive generally absorbs various amounts of water vapor in accordance with the surrounding moisture and thereby changes its qualities. Even in measured value receivers in accordance with the principle of the electromagnetic compensation of force the enamel insulation of the compensation coil can absorb various amounts of water vapor, thus affecting the zero point by their changed eigenweight in the case of sensitive balances. All effects of moisture exhibit a considerable delay in time, since a new water vapor equilibrium develops only slowly. For this reason the availability of older measured data is particularly advantageous in this instance.

In order to be able to simulate the differing behavior in time of different errors, e.g. linearity errors, zero point errors or sensitivity errors, the weighting factors with which the digital signal processing unit evaluates the data stored in the storage area are advantageously set differently for the different corrections.

Some measured value receivers exhibit an error which is generally designated as "creep". In this instance at a change of load the output signal follows it only partially at first and creeps only gradually to the stationary end value. Even this error can be corrected by storing the particular load values in the storage area and by comparing the older load values with the current load value. The further back a load change is, the lesser it is evaluated thereby. These creep errors are heavily dependent on the temperature. It is therefore advantageous if the weighting factors with which the digital signal processing unit evaluates the data stored in the storage area are set at least partially as a function of the temperature.

In order not to let the storage requirement become too great, it is advantageous to select the repetition rate with which new data is fed to the storage area lower than the rate at which measured values are emitted form the measured value receiver.

It is advantageous to the same end to divide the storage area into at least two partial areas and to select the repetition rates with which new data is fed to these partial areas so that they are different. These partial areas can be used for the data from different sensors. The signals from rapidly changing disturbance variables with a short after effect are stored more frequently and, at a set storage capacity, correspondingly erased again more rapidly, while signals from slowly changing disturbance variable with a long after effect are stored less frequently and are thus available for evaluation for a longer period. On the other hand, the two partial areas can also be connected in series. All data is then fed at first to the first partial area, which contains the most recent historical data. Then, the particular average value of the oldest data of the first partial area is transmitted with a repetition rate lower by a factor of n into the second partial area. The second partial area thus contains the earlier historical data with a lesser resolution in time.

It is advantageous, in order to assure a continuous storage of the data of the different disturbances in the storage area even when the balance is not being used, to provide a stand-by circuit and to continue to feed data to the storage area even during stand-by operation.

If a balance without a stand-by circuit is cut back in or if a balance with stand-by circuit is separated from the supply voltage and cut back in, it takes a while until a thermal equilibrium is set again. A zero point and sensitivity drift frequently occurs during this time. In order to be able to correct this error too, another embodiment provides that when the balance is turned on, additional data with which the other, still empty locations of the storage area is loaded is calculated according to a set program from the first data derived form the particular output signal of the sensors. The storage area is thus loaded with data which does not originate from older measured values but rather is calculated in just such a manner that the cut-in drift is corrected. This data is then gradually erased and replaced by measured data.

BRIEF DESCRIPTION OF THE DRAWINGS

The invention is described in the following with reference made to the figures and using the non-limiting example of a balance in accordance with the principle of the electromagnetic compensation of force.

DETAILED DESCRIPTION

Figure 1:
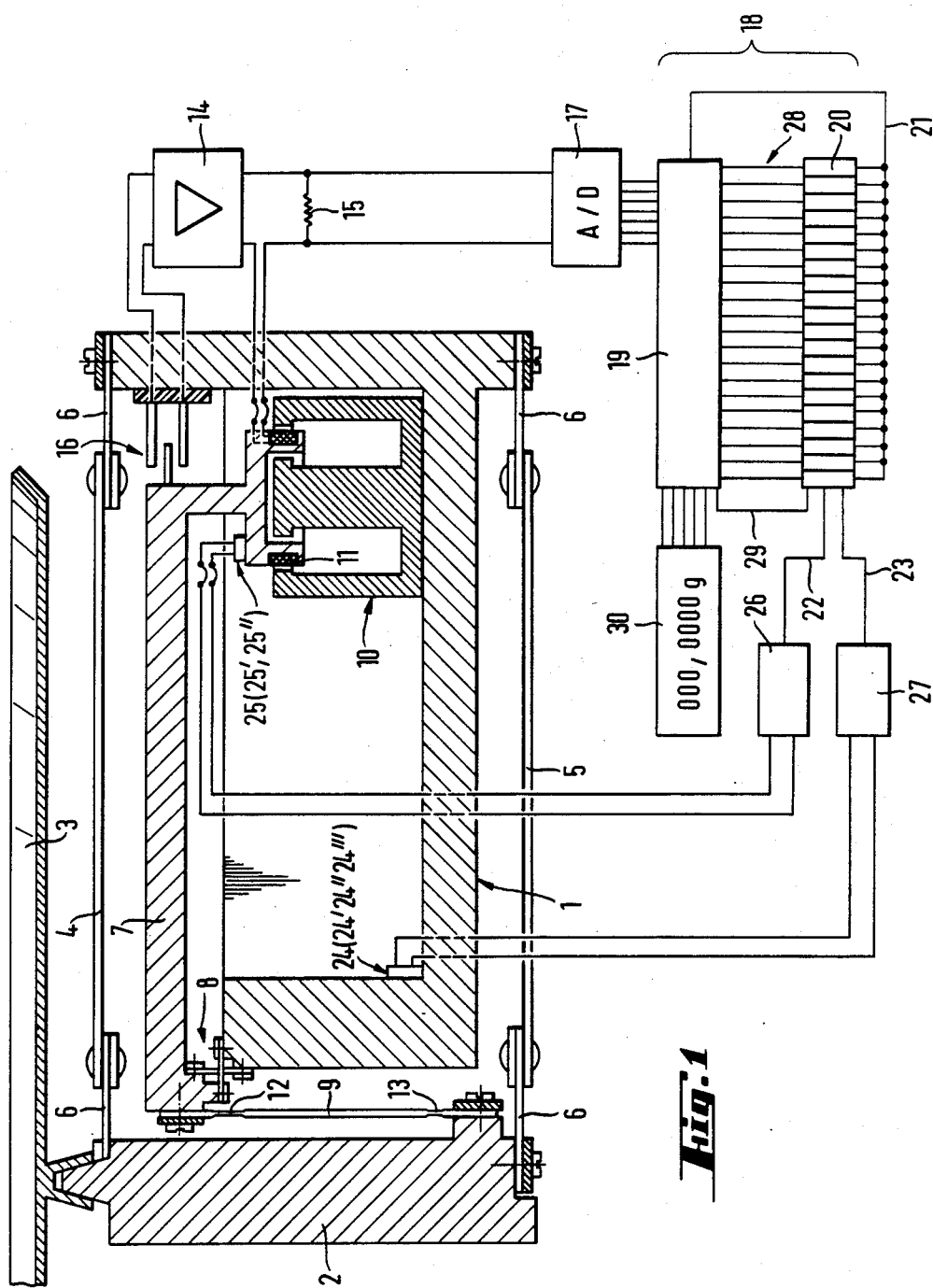
FIG. 1 shows a section through the mechanical part of the balance and a block circuit diagram of the electronic components.

The electric balance in FIG. 1 consists of a support part 1 fixed to the housing to which part load receiver 2 is fastened in a vertically movable fashion via two rods 4 and 5 with articulations 6. The load receiver carries load scale 3 in its upper part for receiving the material to be weighed and transmits the force corresponding to the mass of the weighed material via coupling element 9 with thin areas 12 and 13 to the shorter lever arm of transfer lever 7. Transfer lever 7 is mounted on support part 1 by cross spring joint 8. The compensation force, produced by a current-carrying coil 11 in the air gap of permanent magnet system 10 attacks the longer level arm of transfer lever 7. The magnitude of the compensation current is regulated in a known manner by position sensor 16 and controlled-gain amplifier 14 so that equilibrium prevails between the weight of the material to be weighed and the electromagnetic compensation of force. The compensation current produces a measuring voltage on precision resistor 15 which is fed to digitizer 17. The digitalized result is taken over by digital signal processing unit 18. The digital signal processing unit contains a storage area 20 which is shown as a shift register with twenty storage locations in the example shown. Shift register 20 is timed by the remaining part 19 of the digital signal processing unit over lead 21 and at each timing pulse a new data record is taken via leads 22 and 23 and stored in the first (the left one in the drawing) storage location. At the same time the data record stored previously in the first storage location is taken into the second storage location the data record previously stored in the second storage location is taken into the third storage location, etc., until the twentieth storage location, whose previously stored data record is erased.

The data fed to the input of the shift register stems from sensors 24 and 25 and is prepared in associated signal shaping modules 26 and 27. In the case of analog sensors these signal shaping modules consist, for example, of a digitizer with data store. In the case of sensors with a frequency analog output signal, such as, e.g., quartz temperature sensors, they can consist of a counter. Alternatively they may consist of ternary circuit stages for dividing the measuring frequency down to approximately 1 Hz. This low frequency can then be determined by counting the periodic length with digital signal processing unit 19. However, the data fed to the input of shift register 20 can also be determined (over lead 29) by the digital signal processing unit from the output signal of measured value receiver (elements 1–17). The measured data of sensors 24 and 25 could likewise be fed over signal shaping modules 26 and 27 directly to digital signal processing unit 19 and from there to the shift register, without the mode of operation changing. Digital signal processing unit 19 has access over lead 28 to the individual storage locations of shift register 20. It can take the individual data records, multiply them by weighting factors, calculate the necessary corrections for the output signal of measured value receiver (elements 1–17) from the result and transmit the result into digital display 30.

Figure 2:
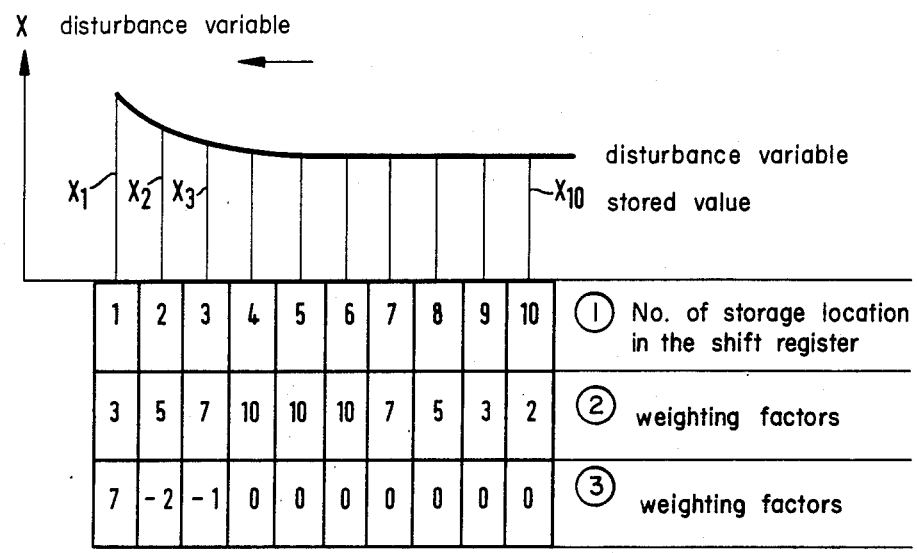
FIG. 2 shows the course in time of a disturbance variable, the values derived therefrom in the storage area and two examples for weighting factors.

The mode of operation given of this circuit can be explained with the examples in FIG. 2. This figure considers only the disturbance variable of temperature, which is measured by a single temperature sensor. Only ten storage locations are assumed for the shift register. The upper part of FIG. 2 shows the assumed course in time of the temperature as a curve, whereby the measure of time progresses form right to left.

The current temperature (line $X_1$) is stored in the first storage location of the shift register. The temperature $X_2$ which prevailed before a timing period, e.g. before one minute ago, is stored in the second storage location. Temperature $X_3$ which prevailed before two timing periods ago is stored in the third storage location, etc. The assumed course of the curve thus shows a temperature rise in the last two timing periods and an approximately constant temperature in the time before them.

If a thermally inert system is to be corrected, then the sensitivity in FIG. 1, which is basically determined by the relatively large and heavy permanent magnet 10, the upper set of weighting factors in FIG. 2 is used. The central storage locations are weighted more heavily and the front and the back storage locations, i.e. the most recent and the oldest data, are weighted less. Thus, the temperature rise assumed in FIG. 2 takes effect only gradually in the last two timing periods and in a time-delayed manner in the magnitude of the temperature-dependent correction, precisely as the temperature-dependent component part, the magnet, warms up only gradually.

The lower set of weighting factors in FIG. 2 is intended for a thermally rapidly reacting system, e.g. in the measured value receiver of FIG. 1 for the zero point, which is largely determined by thin articulations 6 and rods 4 and 5. It is assumed in FIG. 2 that the temperature sensor used reacts more slowly to a temperature change than the measured value receiver does. For this reason an extrapolation is performed from the stored historical measured values of the temperature sensor to the next measured value to be expected. A value is added to the most recent measured value $X_1$, $\frac{3}{4}$ of which results from the rise between the last two measured values $(X_1-X_2)$ and $\frac{1}{4}$ of which results form the rise between the last two measure values $X_2-X_3$:

$$X_1 \pm \tfrac{3}{4}(X_1-X_2)+\tfrac{1}{4}(X_2-X_3)=\tfrac{1}{4}(7X_{12}-X_2-X_3).$$

Thus, the lower set of weighting factors in FIG. 2 (given without a standardizing factor) represents an estimation and the temperature correction is performed at the estimated level as it will be measured by the temperature sensor in the next (future) timing periods. This example is intended to show that the use of properly selected weighing facts can also correct, to a certain extent, errors of the measured value receiver which occur more rapidly during changes in the disturbance variable than the sensor used can recognize.

The time sets of weighing factors in FIG. 2 are intended to show examples of different possibilities of the adaptation of the behavior in time of the sensor and of the measured value receiver. A great number of other groupings of weighting factors is possible. They must be determined in accordance with the special qualities of the sensor and the measured value receiver and implemented in accordance with the signal processing unit.

Just as the determination of the weighting factors must be performed in accordance with the specific balance, sensors 24 and 25 must also be selected according to the specific balance and according to the disturbance variables with the greatest effect.

The following examples are also only intended to show the range of possibilities.

EXAMPLE 1

Moisture sensor 25 is attached to coil body 11 or in its vicinity and temperature sensor 24' is attached to support part 1 fixed to the housing. The moisture effect of the coil winding is corrected from the data of the moisture sensor and the temperature error of the entire measured value receiver is corrected from the data of the temperature sensor. The weighting factors for the moisture effect are indicated as a function of the temperature dependent-behavior in time of the taking of moisture and the temperature-dependent variable of the taking of moisture and the temperature-dependent variable of the taking of water.

EXAMPLE 2

A first temperature sensor 25" is attached to coil body 11 and another temperature sensor 24" is attached to the support part fixed to the housing. Temperature sensor 24" measures the average temperature of the measured value receiver, temperature sensor 25" measures the temperature of the coil, and the difference of the two temperatures shows the load-dependent excess temperature of the coil. The temperature coefficient of the entire measured value receiver is corrected from the stored values of temperature sensor 24" and the effect of the changed lever relationships on lever 7 resulting from the excess temperature of the coil and the changed field strength of permanent magnet system 10 are corrected from the different of the stored data of the two temperature sensors.

EXAMPLE 3

Only one temperature sensor 24''' is present on support part 1 fixed to the housing. Digital signal processing unit 19 calculates the power loss in coil 11 from the output signal of measured value receiver (elements 1–17). The evaluation is performed as in example 2.

EXAMPLE 4

A measured value receiver consisting of a spring body with adhered-on wire stain gauges is associated with a temperature sensor and a moisture sensor in the vicinity of the spring body. The weight-dependent output signal of the measured value receiver is taken into the shift register along with the data of these two sensors. From the stored temperature values the temperature error of the measured value receiver (e.g. the temperature coefficient of the elasticity modulus) is corrected, the weighting factors for the effect of moisture are differently indicated according to the temperature, and in the third place the weighting factors of the stored load values are differently indicated according to the temperature to compensate for creep.

The store requirement goes according to the clock rate with which the data is written in and passed on and according to the time required for which data is required for calculating the corrections. In order not to let the storage requirement become too large, it is recommended not to store a new value in the storage area for each new measured value from the measured value receiver. While the measured values from the measured value receiver are supplied anew approximately every second, it is sufficient in many instances if a new value is taken into the storage area approximately every minute.

Figure 3:
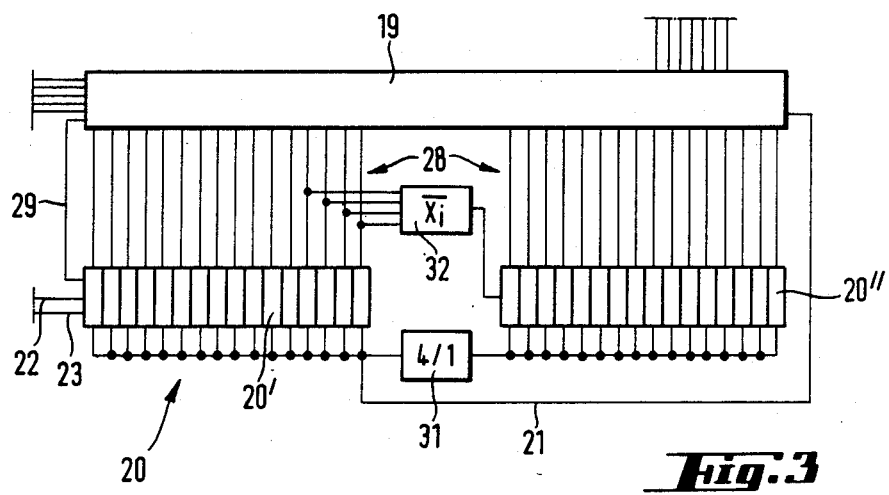
FIG. 3 shows a block circuit diagram of the storage area in a second embodiment.

FIG. 3 shows another possibility of saving storage locations, again using the example of a shift register. This shift register consists of a first partial area 20' with 16 storage locations into which the data is introduced with the clock rate indicated in FIG. 1. The timing for the second partial area 20", which also and 16 storage locations, is reduced in FIG. 3 by a factor of 4 by frequency divider 31. The particular average value of the last four storage locations of the first partial area is transferred into the second partial area (average value former 32). Since this transfer only occurs at every fourth timing pulse of the first partial area, each value from the first partial area is precisely considered for transfer into the second partial area. The arrangement of the partial areas of the shift register shown in FIG. 3 permits the data from a maximum of $4 \times 16 + 16 = 80$ timing periods of the timing of the first partial area to be stored with $16 + 16 = 32$ storage locations. The fact that the older data is present only as an average value over four timing periods is generally not a problem, since a fine resolution in time is no longer so important for the earlier time periods.

This division of the store demonstrated with the example of a shift register can also be transferred in an analogous manner to other storage organizations.

After the balance is turned on, the storage area is empty at first and is only gradually filled with data. The method of operation provided and described above is therefore not yet possible. It is therefore advantageous to provide the balance in a known manner with a stand-by circuit in which the essential parts of the electronic components remain cut in and only the display and other component parts which would age the balance if they are on are cut off. In this instance data can be taken continuously into the storage area even during stand-by operation and correction of the measured value is immediately assured to ±00% after complete cut-in.

If the balance is completely separated from its supply voltage and is cut in again, it is advantageous if further data is calculated from the first measured values of the sensors and stored in the empty locations of the storage area. This calculated data can not show the individual previous history of the balance before it was cut in, but it can be selected in such a manner that the start-up of the balance, which is conditioned by the cut-in, is approximately corrected at approximately constant temperature and moisture.

We claim:

1. Electric balance with a measured value receiver for generating a weight-dependent signal, having a digital signal processing unit, with means for detecting disturbances which affect the measured value receiver (sensor) and with means for correcting errors of the measured value receiver resulting from these disturbances, characterized in that storage means (20) is present in the digital signal processing unit (18) to which digital data is continuously supplied and stored therefor a set time, whereby this data is derived from the particular output signal of sensor means (24', 24", 24''', 25', 25"), and that the digital signal processing unit evaluates the data stemming from different times with set weighting factors and uses it to determine the corrections to be put on the output signal of the measured value receiver.

2. Electric balance according to claim 1 characterized in that the digital data continuously supplied to the digital signal processing unit is also supplied from the output signal of the measured value receiver.

3. Electric balance according to either claim 1 or 2, characterized in that the storage means (20) is organized in the form of a shift register.

4. Electric balance according to either claims 1 or 2, characterized in that the digital signal processing unit (18) is a microprocessor and that a part of a RAM of this microprocessor is used for the storage means (20).

5. Electric balance according to either claims 1 or 2, characterized in that at least one temperature sensor (24', 24", 24''', 25") is present as the sensor means.

6. Electric balance according to claim 5, characterized in that in measured value receiver in accordance with the principle of the electromagnetic compensation of force and having a compensation coil the temperature sensor (25") is fastened to the compensation coil (11).

7. Electric balance according to claim 5 characterized in that an oscillator with a temperature-dependent resonance frequency is used as the temperature sensor.

8. Electric balance according to claim 7 characterized in that an oscillator crystal with an appropriate intersection angle is used as the oscillator with temperature-dependent resonance frequency.

9. Electric balance according to claim 7 characterized in that the temperature-dependent resonance frequency is divided down by divider stages, that the periodic length of this divided-down impulse sequence is counted out by a counter at least approximately constant reference frequency and that the counter result is a digital measure for the temperature of the oscillator.

10. Electric balance according to one of claim 5, characterized in that in the measured value receiver in accordance with the principle of the electromagnetic compensation of force the data fed to the storage means (20) is derived from the output signal of the temperature sensor (24''') and the squared output signal of the measured value receiver (1–17).

11. Electric balance according to one of claims 5, characterized in that at least one moisture sensor (25) is present as the sensor means.

12. Electric balance according to claim 1, characterized in that the weighting factors with which the digital signal processing unit (19) evaluates the data stored in the storage means (20) are set differently for the different corrections.

13. Electric balance according to claim 12, characterized in that the weighting factors with which the digital signal processing unit (19) evaluates the data stored in the storage means (20) is set at least partially as a function of the temperature.

14. Electric balance according to claim 1, characterized in that the data is fed with a set repetition rate to the storage means (20) and that this repetition rate is lower than the frequency with which measured values are emitted by the measured value receiver.

15. Electric balance according to claim 14, characterized in that the storage means (20) is divided into at least two partial areas (20', 20'') and that the repetition rates at which new data is fed to these partial areas are different.

16. Electric balance according to claim 15, characterized in that a stand-by operation is provided and that during the stand-by operation data continues to be fed to the storage means (20).

17. Electric balance according to claim 16, characterized in that when the balance is turned on, additional data with which the still empty locations of the storage means (20) is loaded is calculated according to a set program from the first digital data supplies to the digital signal progressing unit.

* * * * *